Aug. 10, 1926.　　　　　　　　　　　　　　　　1,595,865
B. M. W. HANSON
CHUCK
Original Filed August 20, 1921
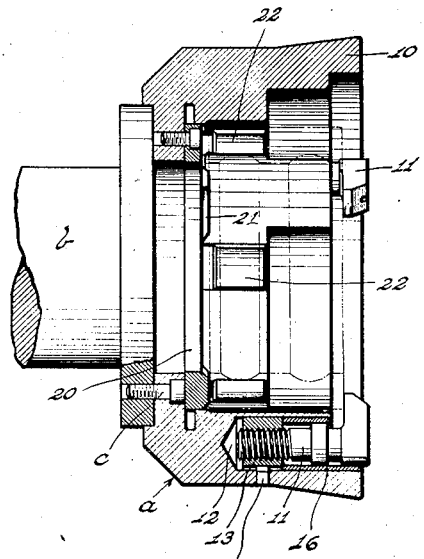
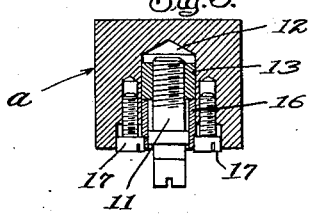
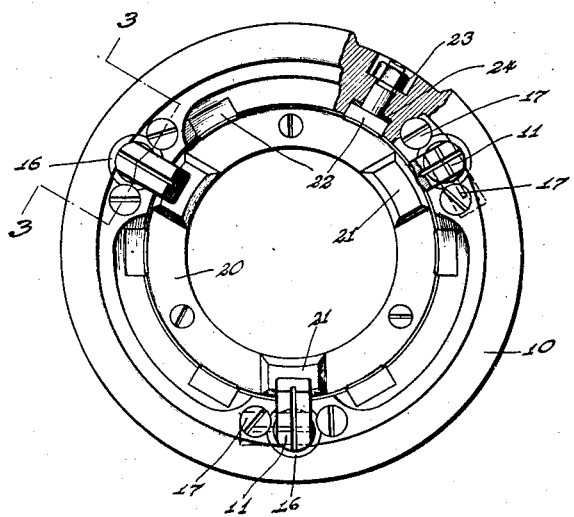
Inventor
Bengt M. W. Hanson
By H. Clay Lindsey
His Attorney Patented Aug. 10, 1926.

1,595,865

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

CHUCK.

Original application filed August 20, 1921, Serial No. 493,780. Divided and this application filed December 20, 1922. Serial No. 608,084

The present application is a divisional of my original application Serial No. 493,780, filed August 20th, 1921, for improvements in grinding machine. The present invention relates to a chuck, and the aim of the invention is to provide a device of this sort having various features of novelty and advantage. More particularly, the invention has as its purpose to provide a chuck which may be readily adjustable to hold pieces of work of different sizes and types, which is readily operable in that pieces of work may be quickly inserted and removed from place within the same, and which is provided with means whereby the chuck may be trued so as to hold objects in proper alinement.

In the accompanying drawing, wherein I have shown, for illustrative purposes, one embodiment which the present invention may take, Fig. 1 is a view taken longitudinally and centrally through my improved chuck;

Fig. 2 is a front view, and

Fig. 3 is a sectional view taken on line 3—3 of Fig. 2.

Referring to the drawing in detail, $a$ denotes, generally, my improved chuck, and $b$ a spindle of any kind to which the chuck is secured, as by means of screws $c$ or the like. The chuck comprises a chambered head or annular body 10 provided with clamping members or bolts 11 which are arranged as follows. In the annular wall of the head 10 are the recesses 12, preferably three in number, and in each of these recesses is a nut 13 keyed against turning as at 14 and receiving the inner end of the clamping bolt 11. Also, in each recess is a bushing 16 engaging at its inner end against the nut 13. Each bushing 16 is adjustable lengthwise by screws 17 carried by the head 10 and overhanging the bushing. When it is desired to adjust the clamping members to accommodate a piece of work of given dimensions, the screws 17 are turned so as to longitudinally adjust the sleeves 16. If the screws 17 are screwed inwardly, the bushings 16 are forced inwardly and with them the nuts 13 so that the heads of the bolts 11 are brought nearer to the shoulder or seat of the chuck body 10 and against which seat the work is adapted to engage. If a piece of work of greater thickness is to be accommodated within the chuck, then the screws 17 are turned to permit the bushings to be moved outwardly, as will be understood from Fig. 3. The clamping members having been longitudinally adjusted, when it is desired to place a piece of work within the chuck, the bolts are turned to the dotted line positions shown in Fig. 2, the work is inserted, and then the bolts are turned to the full line positions shown in Figs. 1 and 2 and in which positions the heads of the bolts overhang and engage the outer surface of the work. It will be seen that with this arrangement, the clamping members may be readily and accurately adjusted to accommodate pieces of work, for instance ball bearing rings, of different lengths, and also take up wear; also, the clamping members may be quickly turned into and out of overhanging engagement with the work so that the latter may be quickly inserted and removed from place within the chuck. As stated in my aforesaid original application, the chuck is peculiarly adapted for use in holding ball race members during the grinding operation of the same, but, of course, the chuck is applicable to other uses. In Fig. 1 of the accompanying drawing, a double ball race is shown by dotted lines held in position in the chuck.

Removably secured to the bottom face of the head 10 is a ring 20 having a plurality, preferably three, lands or spots 21. Carried by the side wall of the chuck body are spots 22 which are preferably in the form of studs secured in place by nuts 23 so that they may be readily positioned and removed from place. The advantage of these spots is that by properly grinding them after they are positioned in the chuck body they may be correctly trued up to hold the object to be operated upon in the proper alinement. Shims 24 are provided to take up wear in the spots 22.

As is shown in Figures 1 and 2 the spots 22 are provided with non-circular heads and fit in recesses which are correspondingly shaped, so as to hold the spots from turning after they have been properly ground and trued the heads also serving to support the shims 24 against the bottoms of the recesses in which the heads are placed to provide a substantial support for the heads of the spots. The heads of the spots 22 are thus held from turning out of position so that their grinding and location may be accurate.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:—

1. A chuck including a chambered body having spot receiving openings in the walls thereof and provided with non-circular recesses at the inner ends of the openings facing the interior of the body, and a plurality of removable spots fitting in said openings and having heads with end faces having flat concave seats to engage and spot cylindrical work, seating in and conforming in shape to the recesses for holding the spots from rotation after the same have been ground and located.

2. In a chuck, a body portion having a recess therein, a nut fitting in the recess and held against rotation therein, a clamping bolt threaded in the nut and extending outwardly of the body portion and having an overhanging jaw on its outer end, a bushing slidably fitting in the recess against said nut, and adjustable means at opposite sides of the clamping bolt and engaging the opposite sides of the bushing for holding the same adjustably in said opening.

BENGT M. W. HANSON.